US007280704B2

(12) United States Patent
Peli

(10) Patent No.: US 7,280,704 B2
(45) Date of Patent: Oct. 9, 2007

(54) WIDE-BAND IMAGE ENHANCEMENT

(75) Inventor: Eliezer Peli, Newton, MA (US)

(73) Assignee: The Schepens Eye Research Institute, Inc., Boston, MA (US)

( * ) Notice: Subject to any disclaimer, the term of this patent is extended or adjusted under 35 U.S.C. 154(b) by 930 days.

(21) Appl. No.: 10/619,124

(22) Filed: Jul. 14, 2003

(65) Prior Publication Data

US 2004/0013314 A1   Jan. 22, 2004

Related U.S. Application Data

(63) Continuation of application No. 09/234,846, filed on Jan. 22, 1999, now Pat. No. 6,611,618, which is a continuation-in-part of application No. PCT/US98/23933, filed on Nov. 10, 1998.

(60) Provisional application No. 60/065,297, filed on Nov. 13, 1997, provisional application No. 60/070,122, filed on Dec. 31, 1997.

(51) Int. Cl.
*G06K 9/40* (2006.01)
(52) U.S. Cl. ...................... 382/260; 382/254
(58) Field of Classification Search ................ 382/128, 382/154, 195, 199, 232, 254, 260, 263, 266, 382/270, 274
See application file for complete search history.

(56) References Cited

U.S. PATENT DOCUMENTS

| | | | | |
|---|---|---|---|---|
| 4,535,417 A | * | 8/1985 | Peacock | ...................... 708/300 |
| 5,561,724 A | * | 10/1996 | Kido et al. | .................. 382/264 |
| 5,602,934 A | * | 2/1997 | Li et al. | ...................... 382/128 |
| 5,717,789 A | * | 2/1998 | Anderson et al. | ........... 382/254 |

(Continued)

FOREIGN PATENT DOCUMENTS

EP   540 394   5/1993

(Continued)

OTHER PUBLICATIONS

Kohlmann, K., "Corner detection in natural images based on the 2-D Hilbert transform," *Signal Processing European Journal devoted to the Methods and Applications of Signal Processing*, 48(3):225-234, (1996).

(Continued)

*Primary Examiner*—Duy M. Dang
(74) *Attorney, Agent, or Firm*—Weingarten, Schurgin, Gagnebin & Lebovici LLP

(57) ABSTRACT

An image processing technique produces modified images by extracting strong features of the original image, i.e., bars and edges, and superimposing such extracted features onto the original image. The invention combines the Hilbert transform of the image data with the image data in a pre-defined manner to produce the so-called energy function whose maxima correspond to the strong features of the image. Addition of these extracted features to the original image results in obtaining an enhanced image. In addition, the invention provides techniques for enhancing the real-world view of natural scenes. Another practice of the invention employs a plurality of oriented filters for extracting luminance features of an image. An apparatus of the invention displays the extracted luminance features as contour version of the original image. Another apparatus of the invention provides a minified contour image of a natural scene to assist a patient having a restricted peripheral vision in locating objects in the scene.

30 Claims, 17 Drawing Sheets

U.S. PATENT DOCUMENTS 5,768,405 A * 6/1998 Makram-Ebeid ............ 382/128

FOREIGN PATENT DOCUMENTS

| JP | 09/063314 | 7/1997 |
| WO | EP 366075 | 5/1990 |
| WO | WO 96/01440 | 1/1996 |
| WO | WO 99/26199 | 5/1999 |

OTHER PUBLICATIONS

Peli, E., "Limitations of image enhancement for the visually impaired," *Optometry and Vision Science*, 6:15-24 (1992).

Peli, E., et al., "Image enhancement for the visually impaired: The effects of enhancement on face recognition," *Journal of Optical Society of America*, 11:1929-1939 (1994).

Peli, E., "Adaptive enhancement based on visual model", Optical Engineering, vol. 26, No. 7, Jul. (1987).

Peli, E., "Contrast in complex images," *Journal of Optical Society of America*, 7:10:2032-2040 (1990).

* cited by examiner

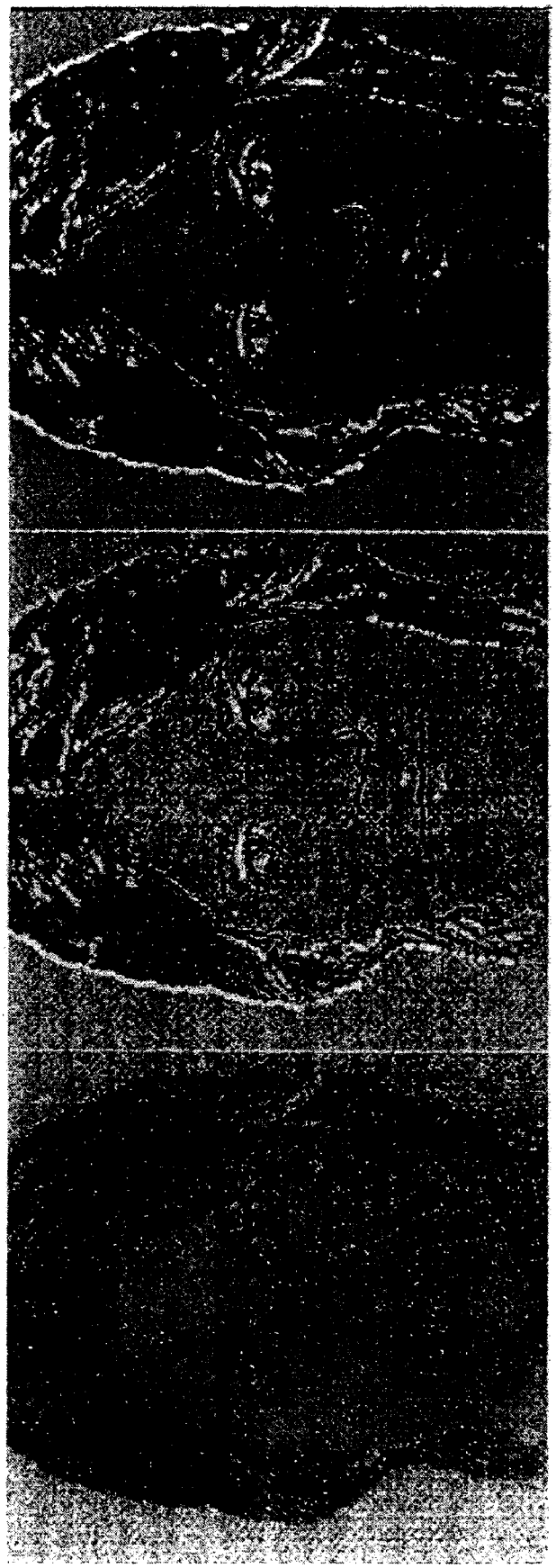

ORIGINAL

ENHANCED (2-dir)

ORIGINAL

ENHANCED (4-dir)

ORIGINAL

ENHANCED

ORIGINAL

ENHANCED

WIDE-BAND IMAGE ENHANCEMENT

RELATED APPLICATIONS

This application is a continuation of U.S. patent application Ser. No. 09/234,846, filed on Jan. 22, 1999, now U.S. Pat. No. 6,611,618, which is a continuation-in-part of PCT application Serial No. PCT/US98/23933 filed Nov. 10, 1998, which claims priority to U.S. provisional applications Ser. No. 60/065,297 filed Nov. 13, 1997 and Ser. No. 60/070,122 filed Dec. 31, 1997.

STATEMENT REGARDING FEDERALLY SPONSORED RESEARCH OR DEVELOPMENT

This invention was made with Government Support under Grant Number EY05957 awarded by the National Institutes of Health. Therefore, the government has certain rights in the invention.

BACKGROUND

This invention relates to methods and apparatus for image processing and more particularly to image enhancement. In particular, the invention relates to methods and apparatus for the enhancement of both video images of natural scenes that contain a wide range of spatial frequencies and of real-world views of natural scenes.

Traditional image enhancement methods suffer from a number of drawbacks. Many traditional image enhancement methods can not effectively enhance images over a wide band of spatial frequencies. For example, one technique enhances an image by changing its spatial frequency content through manipulation of the coefficients of a discrete cosine transform ("DCT") of the image. The method segments the image into 8×8 pixel sections and obtains the cosine transform of each section. This technique fails to capture low frequency components that arise as a result of features that have significant variations in luminance mainly over an area larger than an 8×8 pixel section. Other techniques process an image in the spatial domain. Such techniques typically enhance the image only over a narrow range of frequencies. See E. Peli, "Limitations Of Image Enhancement For The Visually Impaired," Optometry and Vision Science, vol. 6, pp. 15-24 (1992); and E. Peli, E. Lee, C. L. Trempe, S. Buzney, "Image Enhancement For The Visually Impaired: The Effects Of Enhancement On Face Recognition", Journal of Optical Society of America, vol. 11 pp. 1929-1939 (1994).

Therefore, such traditional image enhancement techniques are not suitable for enhancing the images of many natural scenes that contain a wide range of spatial frequencies. Further, human observers detect moving objects that contain a wide band of frequencies more readily than those with a narrow band of frequencies. Thus, the traditional techniques are not appropriate in systems for assisting detection of moving objects, or in systems that provide real-time viewing enhancement of natural scenes.

Traditional methods also can not readily enhance an image while the size of the image changes. For example, the viewer of a digital television display could desire to follow the image of an object that undergoes a large change in its size while maintaining a selected degree of enhancement. The ability to enhance a wide range of frequencies is crucial in such applications. Traditional techniques, such as a DCT method or other band-limited methods are not appropriate for such applications because they provide a limited range of spatial frequencies of the image.

In addition, traditional enhancement methods, both in the spatial domain and in the frequency domain, typically manipulate a large fraction of pixels. As a result, their use in the enhancement of color pictures requires tracking the color content of many pixels while the computation changes the luminance of those pixels.

Accordingly, it is an object of this invention to provide methods and apparatus for enhancing images over a wide band of spatial frequencies.

It is another object of the invention to provide methods and apparatus that can readily enhance such images over a reasonable range of image sizes.

It is yet another object of the invention to provide methods and apparatus for real-time viewing enhancement of natural scenes.

It is a further object of the invention to provide methods and apparatus for better enhancement of color pictures.

It is yet a further object of the invention to provide methods and apparatus for expanding field of view of a patient suffering from peripheral field loss.

The invention is next described in connection with illustrated embodiments. It will, however, be obvious to those skilled in the art that various modifications can be made in the embodiments without departing from the spirit or scope of this invention.

SUMMARY OF THE INVENTION

The methods and apparatus according to this invention modify an image by 1) locating certain features of the image, such as the boundaries of objects in the image, 2) manipulating such located features to obtain modified features, and 3) adding the modified features to the original image. In particular, one embodiment of the invention employs a two-dimensional Hilbert transform of the image data to create a two-dimensional function, a so-called energy function, whose local maxima correspond to points lying on the boundaries between regions of marked difference in luminance, i.e., edges, or to points corresponding to peaks or troughs in luminance, i.e., bars. The invention further provides techniques to interconnect these maxima, thus delineating the desired features.

An application of this invention is to improve the visibility of video images for people with visual impairment, e.g., cataracts or macular degeneration. In particular, one embodiment of the present invention allows real-time image processing and enhancement of the real-world view for the visually impaired. This embodiment includes a dedicated microprocessor, programmed to extract the boundaries of objects in the field of view, according to the methods of the invention from data inputted from a digital camera. This embodiment also incorporates video equipment to project extracted features onto screens. These screens can be integrated in a wearable real-time image enhancement apparatus, such as a head mounted display ("HMD") display unit.

Another application enhances the real-world view, under reduced visibility conditions such as fog, by projecting the enhanced features, obtained from non-visual sensors, e.g., infrared or radar, on heads-up displays (HUD) of an airplane or of a car windshield. Another application of this invention is to improve the visibility of television images for individuals with visual impairment. Yet other applications relate to the enhancement of satellite and reconnaissance pictures or other military imaging devices, and to the delineation of features of interest in such pictures.

The invention is typically practiced on a digital image that consists of a discrete two-dimensional map of luminance. Some embodiments of the invention represent such images by two dimensional matrices. The invention employs an extension of well known methods for calculating the Hilbert transform of a function in one dimension to obtain a discrete two-dimensional Hilbert transform of a function of the image data.

It is well understood that the one-dimensional Hilbert transform of a function of a single variable can be calculated by 1) obtaining the Fourier transform of the function, 2) obtaining a modified transform function whose values are zero at points where its independent variable is less than zero, and whose values are those of the Fourier transform at points where its independent variable is larger than zero. A third step is to obtain the inverse transform of this modified transform function.

One preferred embodiment of the invention obtains the two-dimensional Hilbert transform of the image data by 1) computing the two-dimensional Fourier transform of the image, 2) obtaining a new two-dimensional transform function whose values in a selected arbitrary contiguous half of the two-dimensional Fourier plane are zero, and whose values correspond to those of the two-dimensional Fourier transform of the image in the other half, and 3) obtaining the inverse Fourier transform of the modified transform function. The real part of the complex inverse Fourier transform of the modified transform function corresponds to the original image and the imaginary part corresponds to the Hilbert transform of the image.

One preferred embodiment of the invention combines the image data with the Hilbert transform of the image data to obtain a new two-dimensional function, a so-called energy function. In particular, the procedure for forming the energy function calls for obtaining the square root of the Pythagorean sum of the image data and of the values of the Hilbert transform at each point, e.g., at each pixel of a digital image.

One embodiment of the invention utilizes the positions of the peaks of the energy function to locate the visually relevant luminance features of the image. It is understood that such peaks correspond to peaks or troughs in luminance, or to those locations in the original image where changes in image intensity profile occur because of the existence of maximal phase congruency among the various Fourier components of the image.

The local maxima of the energy function correspond to points of both minimum and of maximum intensity in the original image data, and also to the boundaries between regions of low and of high luminance. It is not reasonably feasible to classify the maxima of the energy function with respect to the polarity of the corresponding points in the image data based purely on the energy function. Thus, some embodiments of the invention implement a further examination of the image data at each point that corresponds to a maximum of the energy function to label the polarity of each such maximum.

One aspect of the present invention relates to the creation of a map of dots corresponding to the points designated as the maxima of the energy function. The invention optionally employs methods known in the a t to connect these dots to produce lines corresponding to the desired features. In addition, the invention provides the capability of manipulating these lines by widening them through convolution with an appropriate windowing function, e.g., a Gaussian with a selected width, or manipulating their intensities, to improve the contrast of the image.

Some embodiments of the invention employ only one arbitrarily selected polarity, i.e., either dark or bright, to display the dots or the contour lines at edges, whereas other embodiments utilize two polarities. A bipolar representation displays an edge with two dots, one dark and the other bright, next to each other. Some embodiments that utilize a bipolar representation examine the unmodified image to select a choice for juxtaposition of the dark and bright dots that corresponds to the sense of the transition of luminance at the corresponding location of the image. Both embodiments represent the polarity of bars in accordance with the polarity in the original image. Other embodiments of the invention use only a single polarity of dots, i.e., light or dark, to represent all bars or edges.

A preferred embodiment of the invention superimposes these modified contour lines onto the original image to obtain a new image in which certain features have been modified, e.g., the boundaries of the objects in the image have been enhanced.

The invention can also enhance color images. Because the invention manipulates only a limited number of pixels, i.e., those corresponding to the visually relevant features of the image, only a few pixels change color due to the enhancement. Thus, the methods of the invention are better in preserving the color of an image than other enhancing techniques.

An alternative method for locating luminance features, such as edges and/or bars, of an image and their polarities employs a plurality of oriented filters to extract the luminance features. The application of a number of filters having different center frequencies, and optionally different bandwidths, to the image provides a plurality of filtered images. One preferred practice of this aspect of the invention assigns to each pixel of a filtered image either a dark, a light, or a gray scale in a manner described below, to provide an assigned image. A contour constructor, such as a programmable digital processor, receives the assigned images, and obtains the features of the original image by application of a set of pre-programmed steps to the assigned images, as described further below.

In another aspect, the invention expands the field of view of patients suffering from loss in their peripheral vision. In particular, one practice of this aspect of the invention obtains a spatially minified image of the natural scene, and extracts the luminance features of the minified image. Video equipment projects the extracted features on a transparent screen disposed before at least one eye of the patient. The patient can readily locate objects in the minified image, and view the located objects directly by scanning her eyes and/or by moving her head.

Another aspect of the invention relates to providing a night vision device that facilitates night mobility of patients who suffer from a loss of night vision. In particular, one practice of the invention obtains an infrared image of a natural scene, extracts the contours of objects in the image according to the teachings of the present invention, and projects the contours onto a see-through visual screen disposed in front of at least one of the patient's eyes.

One further practice of the invention relates to intraocular implantation of a telescope that is configured as a minifier into a patient's eye, to provide a wide-angle minified view of a natural scene. Such a minified view helps the mobility of a patient suffering from peripheral field loss.

Thus, the invention attains the objectives set forth above by extracting visually relevant features of an image, manipulating these features to obtain modified features, and superimposing such modified features onto the original image to obtain a modified image.

These and other features of the invention are more fully set forth below with reference to the detailed description of illustrated embodiments, and the accompanying drawings.

ILLUSTRATED EMBODIMENTS

Figure 1:
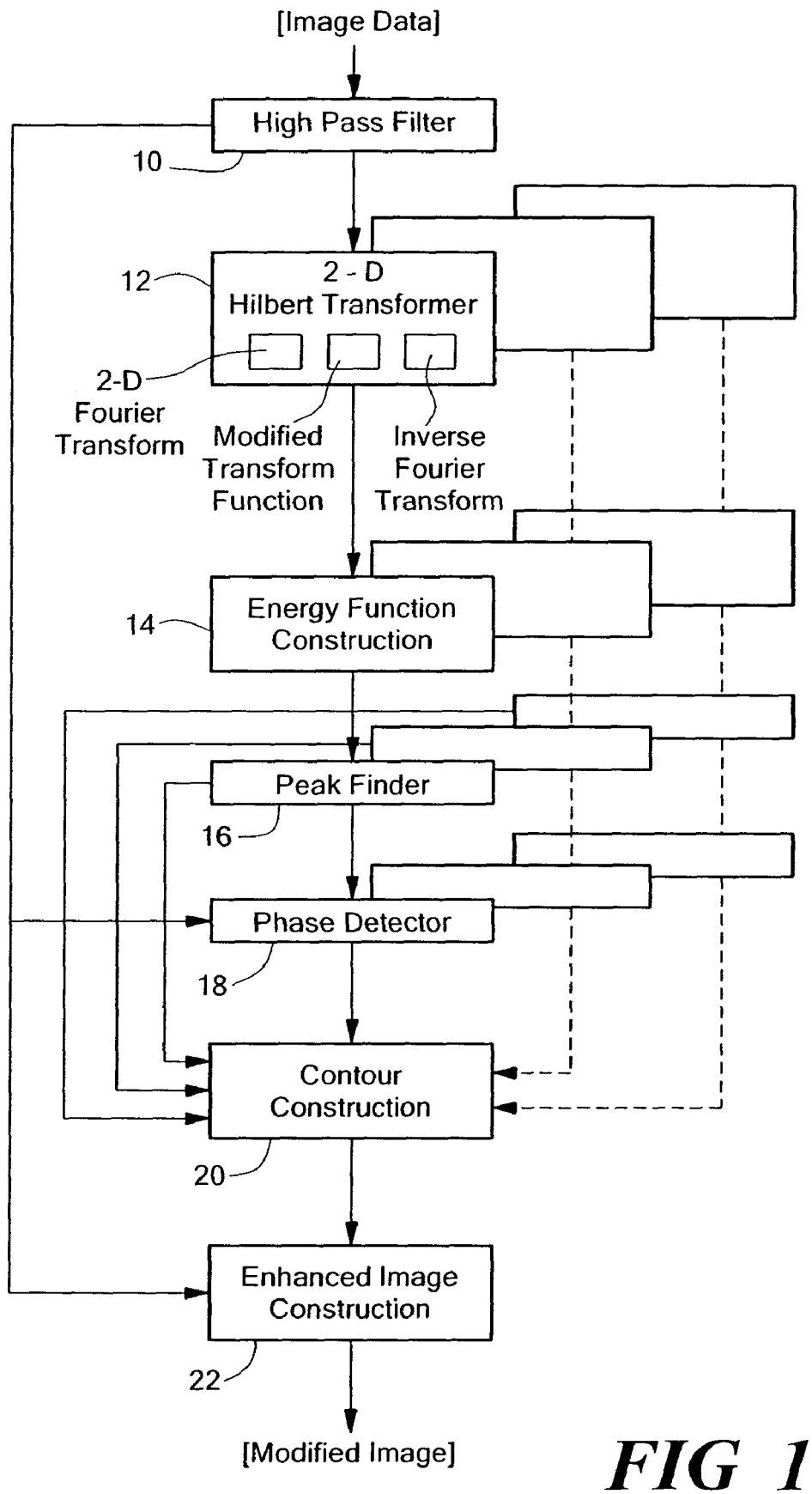
FIG. 1 is a flow chart depicting steps according to one embodiment of the invention for enhancing a wide-band image.

The flow chart of FIG. 1 shows various steps that an illustrated embodiment of the invention employs to modify an image represented by Image Data. The particular illustrated embodiment in step 10 applies a high pass filter in the spatial frequency domain to the image data to eliminate selected frequency components of the image. The high pass filter is typically constructed to retain frequency components that correspond to a few cycles per image, e.g., sixteen cycles per image or higher, and to discard components that correspond to lower frequencies.

The illustrated embodiment of FIG. 1 obtains the two-dimensional Hilbert transform of the filtered image data in step 12 by performing a sequence of three operations on the filtered input image data. The first operation calculates the two-dimensional Fourier transform of the filtered image data to obtain a transform function. The second operation creates a modified transform function that vanishes over a selected contiguous half of the two-dimensional Fourier space of the transformed filtered image data, and has values identical to those of the transform function of the previous operation in the other half. The third operation applies an inverse Fourier transform to the modified transform function to obtain a complex function whose imaginary part corresponds to the Hilbert transform of the filtered image data.

An alternative practice of the operations of step 12 of the FIG. 1 sequence, suited for manipulating an image data that is represented by a two-dimensional matrix, obtains a discrete two-dimensional Hilbert transform of the image data by performing a different set of three operations. The first operation calculates a discrete two-dimensional Fourier transform of the image matrix to obtain a transform matrix. The second operation sets the values of a selected half of the components of the transform matrix to zero to obtain a modified transform matrix, and the third operation obtains the discrete inverse Fourier transform of the modified matrix to obtain a matrix whose imaginary part corresponds to the discrete Hilbert transform. As mentioned above, the use of this alternative practice of the invention is particularly suited when the image data is represented by a matrix of intensity values corresponding to the intensities of a two-dimensional set of pixels representing the image.

There exists an inherent arbitrariness in the choice of the half of the modified transform matrix that is set to zero. One preferred embodiment of the invention sets the lower half of the transform matrix to zero to obtain the modified transform matrix. Another embodiment sets the upper half of the transform matrix to zero to obtain the modified transform matrix. Yet, another embodiment sets the components below the diagonal of the matrix to zero and retains the rest. Setting a selected half of the transfer matrix to zero corresponds to obtaining the Hilbert transform along a particular direction. The choice of the direction of the Hilbert transform can depend on a number of factors such as, the predominant orientation of the luminance features of the image and/or computational convenience. Subsequently, application of a discrete inverse Fourier transform to the modified transform matrix results in obtaining a matrix of complex numbers, the inverse modified transform matrix, whose imaginary part corresponds to the discrete Hilbert transform of the filtered image data. Each choice of a modified transform matrix, i.e., choosing which half of the transform matrix is set to zero, corresponds to obtaining a Hilbert transform along a particular direction in the image plane, e.g., horizontal or vertical. The multiple panels of the step 12 are meant to depict such selections of different orientations. Each orientation can preferentially extract luminance features lying mainly along that orientation.

Those skilled in the art appreciate that a similar arbitrariness exists in creating a two-dimensional Hilbert transform if a continuous function rather than a matrix represents the image data. This arbitrariness stems from the choice of the half of the two-dimensional plane on which the values of a modified transform function, described above, are zero.

FIG. 1 shows that a step 14 of the illustrated embodiment constructs a so-called energy matrix by performing four successive operations on the image matrix and the discrete Hilbert transform of the image matrix, represented by the imaginary part of the modified transform matrix. The first operation obtains the square of the image matrix. The second operation obtains the square of the discrete Hilbert transform matrix. The third operation adds the square of each matrix to the square of the other, and the fourth operation computes the square root of the summation to obtain the energy matrix. Those skilled in the art will understand that the same sequence of operations provides an energy function when applied to continuous functions, rather than to discrete representations of such functions by matrices. Those skilled in the art will also appreciate that there are methods, other than the Fourier method described above, for obtaining two-dimensional Hilbert transforms for use in the practice of the invention. A peakfinder step 16 of the illustrated embodiment, shown in FIG. 1, receives the energy matrix, and provides a number of maximum points of the energy matrix to subsequent steps of the illustrated embodiment by performing the following three operations. The first operation locates the local extrema of the energy matrix, i.e., local maxima and minima, by computing a two-dimensional gradient of the energy matrix and finding points at which the gradient vanishes, according to known methods in the art. The second operation determines whether such a point corresponds to a local maximum or a local minimum of the energy matrix, by employing the second derivative of the energy matrix at each located extremum or by employing other known methods, and retains the maximum points and discards the minimum points. The third operation compares the intensity of the maxima of the energy matrix or the intensity of the second derivative of the energy matrix at each selected maximum with a pre-defined threshold value, and retains only points whose intensities exceed the threshold value.

The maxima that the peakfinder step selects correspond to three types of features in the original image. They can either indicate the locations of minimum or maximum intensities, i.e., bars, or transitions between regions of varying intensities, i.e., edges. In the case of edges, the polarity of the transitions for a pre-defined direction, e.g., left to right and top to bottom, can not be readily gleaned from the energy matrix.

One implementation of the illustrated embodiment chooses an arbitrary unipolar representation of the located maxima, i.e., it represents the maxima as bright or dark dots regardless of whether they correspond to bars or edges and also regardless of their actual polarities. Another implementation that opts for a bipolar representation employs dark and bright dots, symmetrically disposed with respect to the locations of the maxima, to display the maxima. One such implementation chooses an arbitrary polarity for displaying the dark and bright dots that represent edges based on the arbitrary selection of the orientation of the Hilbert transform, whereas a different implementation examines the image data to choose a polarity that corresponds to that in the image.

FIG. 1 shows that a phase detector step 18 of the illustrated embodiment receives the image data and locations of the extrema of the energy matrix to provide the option of examining the image data in a selected neighborhood of each pixel corresponding to a maximum of the energy matrix, to determine whether such a pixel corresponds to a bar or an edge in the image. In addition, this step determines polarities of the transitions in luminance at points corresponding to edges in the image.

Further reference to FIG. 1 illustrates that a step 20 of the illustrated embodiment utilizes the information that the step 16 supplies, and also in some implementations the information that the step 18 supplies, to create contour lines corresponding to selected visually relevant luminance features of the image by performing three operations. The first operation creates a two-dimensional map of dots corresponding to the selected maxima. The second operation, which is optional, can alter the widths of the dots through convolution with a tapered window, e.g., a Gaussian function with a pre-determined width, or alternatively enhance the dots by changing the degree of their luminance. The third operation, which is also optional, joins proximal dots to create contour lines in a manner known in the art.

An enhanced image construction step 22 of the illustrated sequence superimposes a display of the contour lines output from the step 20, onto the original image. The resultant enhancement can be unipolar or bipolar, and it can have an arbitrary polarity or a polarity that corresponds to that of the feature in the actual image.

Thus, the illustrated embodiment, employing steps 10 through 22 of FIG. 1, produces an enhanced version of the original image by accentuating the visually relevant luminance features of the image.

Figures 2D, 2E, 2F:
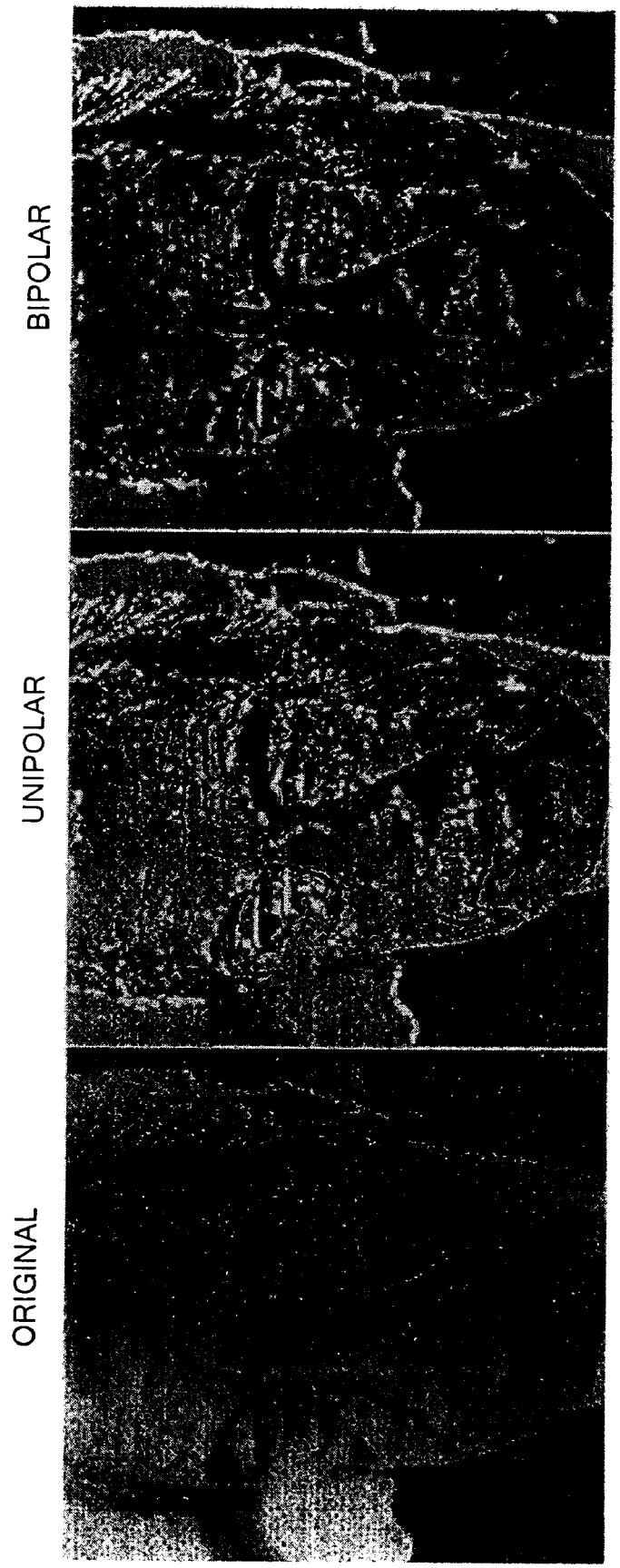
FIG. 2 illustrates examples of the application of the methods depicted in FIG. 1 to two images with both the unipolar and bipolar representations of edges, FIG. 3 provides examples of the application of two alternative embodiments of the invention, where one embodiment employs two Hilbert transforms along two directions and the other employs four such transforms.
Figure 3A:
Figure 3B:
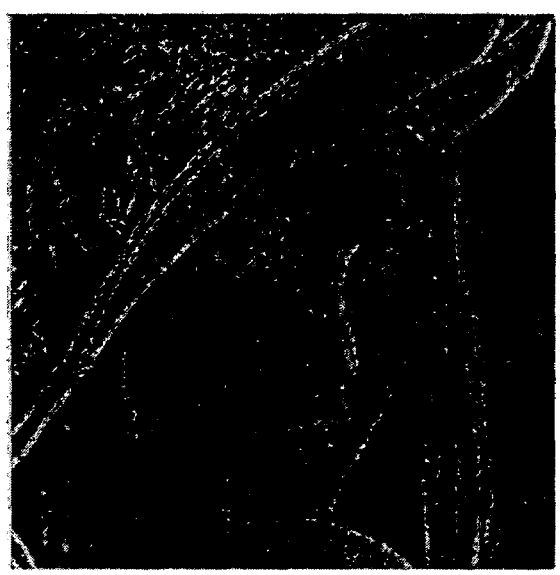
Figure 3C:
Figure 3D:

FIG. 2 illustrates the results of the application of the method of the embodiment illustrated in FIG. 1 to two images. In particular, the different views in FIG. 2 allow the comparison of unipolar and bipolar edge representations of the modified images. For example, views 2E and 2F show that both the unipolar and bipolar displays represent the wrinkles on the forehead of the depicted subject, i.e., bars, as dark lines. The views 2B and 2E show that the unipolar displays represent edges, such as transitions in luminance at the boundary of the jacket and the face, as dark lines, whereas the views 2C and 2F show that bipolar displays represent such transitions as dark and bright line pairs disposed symmetrically with respect to the center of the transition. Furthermore, a comparison of the bipolar edge representations in views 2C and 2F, with the views 2A and 2D of the unmodified images, readily illustrates that the chosen polarities of the edges correspond to the actual polarities in the unmodified images.

Referring back to FIG. 1, another embodiment of the invention combines multiple Hilbert transforms to produce a modified energy function of the filtered image. For example, one implementation of this embodiment employs the Hilbert transform step 12 to obtain two Hilbert transforms of the image data corresponding to two different orientations of axes in the Fourier plane. In such an embodiment, the energy construction step 14 creates two energy matrices corresponding to the two Hilbert transforms. The peak finder step 16, receives the energy matrices and obtains the extrema of the energy matrices. The optional phase detector step 18 determines the polarity of transitions of the luminance features of the image data corresponding to the extrema of the energy matrices, The contour construction step 20 receives the output of the peakfinder step 16 and the phase detector step 18, and creates contours of all features obtained through the multiple Hilbert transforms. The image constructor step 22 superimposes all these contours onto the original image to produce an enhanced image.

One advantage of employing multiple Hilbert transforms in the step 12 of FIG. 1 sequence is that each transform results in a preferential delineation of luminance features that substantially lie in the direction of the selected axes, in the two-dimensional Fourier plane, utilized to obtain the transform. Thus, superposition of luminance features obtained from a set of Hilbert transforms results in better enhancement of the image than superposition of features obtained from only one such transform.

FIG. 3 provides a comparison of two enhanced versions of an image obtained by employing multiple Hilbert transforms in accord with the procedure of FIG. 1. In particular, the view 3B of the original image 3A was obtained by employing two Hilbert transforms in the step 12 of FIG. 1, whereas the view 3D of the original image 3C was obtained by employing four Hilbert transforms in the step 12.

Figure 4:
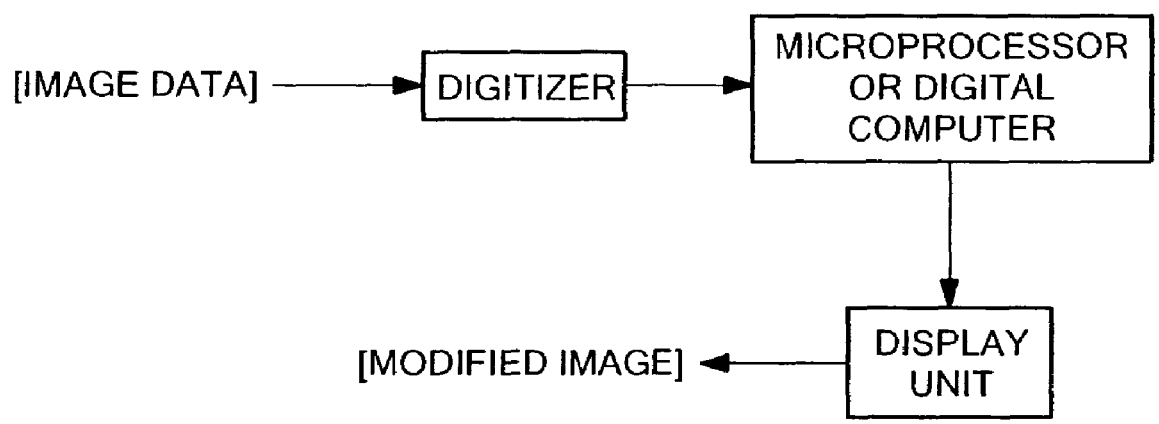
FIG. 4 shows a flow chart depicting an apparatus according to an embodiment of the invention.

FIG. 4 shows an image processing system according to an embodiment of the invention for implementing the procedure of FIG. 1. A digitizer 24, responsive to an analog image data, supplies a digitized image data corresponding to an input image to a microprocessor or a programmed digital computer 26. The microprocessor or the computer is programmed to perform a sequence of operations corresponding to the steps 10, 12, 14, 16, 18, 20, and 22 of the illustrated embodiment of FIG. 1 on the digitized inputted image data to obtain data corresponding to an enhanced version of the input image. A display unit 28, e.g., a monitor or a viewer, receives the output of step 22 to present an enhanced version of the input image to an observer.

Figure 5:
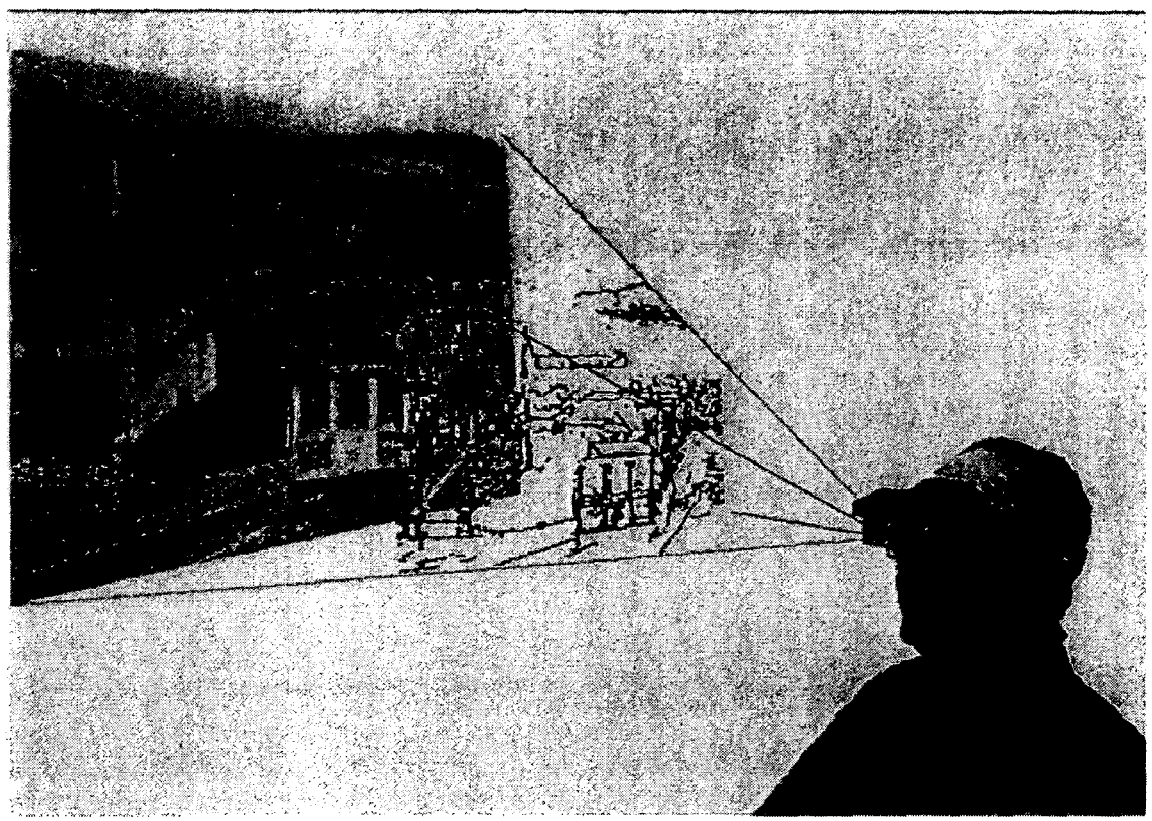
FIG. 5 shows a human observer employing an apparatus according to an embodiment of the invention for the real-time viewing enhancement of natural scenes.
Figure 6A:
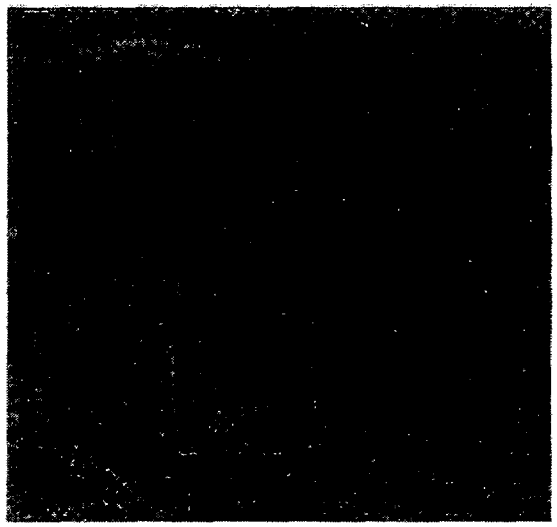
FIG. 6 shows an original image and three enhanced versions of the original image obtained according to an embodiment of the invention, where the image labeled "enhanced" employs both dark and bright lines, and the other two modified images employ only bright lines.
Figure 6B:
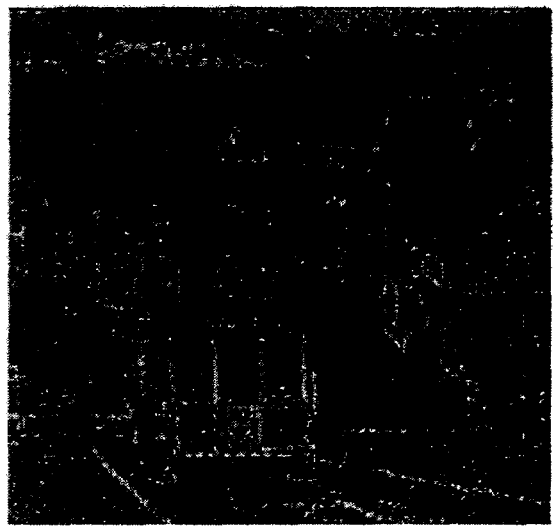
Figure 6C:
Figure 6D:

FIG. 5 shows an illustrated embodiment of the invention according to the apparatus of FIG. 4 that allows real-time image enhancement of real-world scenery. Reference to FIG. 4 shows a human observer wearing apparatus according to the invention and which includes a video camera, preferably a digital camera, that provides image data corresponding to the natural scene 29. The apparatus transfers the digital image data to a dedicated microprocessor, programmed to extract the bars and edges in the image and to provide a contour map of the extracted bars and edges according to the method of the present invention. The processor transfers the contour map to a video display module that projects the map on two partially transparent screens positioned in the front of the observer's eyes, known in the art as a see-through head-mounted display. This projected map 29A allows the observer to view the natural scene with an enhancement of its distinctive features. The video display module can be, for example, that employed in a see-through head mounted display unit sold under the trade name i-glasses by Virtual I-O company of Seattle, Wash., U.S.A. Alternatively, the visual display module of a see-through head mounted display unit sold under the trade name glasstron by Sony corporation of Japan can be adapted for use in the present invention.

Due to the limited visual field of the display device, the apparatus of FIG. 5 is typically configured to enhance only a portion of an observer's field of view, e.g., the central portion. Such apparatus continuously enhances the central portion of the observer's field of view as the observer turns her eyes from one part of a natural scene to another. Other parts of the natural scene are enhanced when the observer turns her head towards them.

FIG. 6 depicts various modified versions of a natural scene, employing different polarities, according to the methods of the present invention. The image labeled "enhanced" 6B uses a bipolar representation. The bottom images 6C and 6D use only positive polarities, i.e., bright lines. The use of bright lines is the practical method for enhancing the real world view. While the image labeled "positive only" uses bright lines to represent only features that correspond to positive polarity in the original image, the image labeled "all positive" uses bright lines to represent all features of interest, including those that are represented by dark lines in the bipolar enhanced image.

Figure 7:
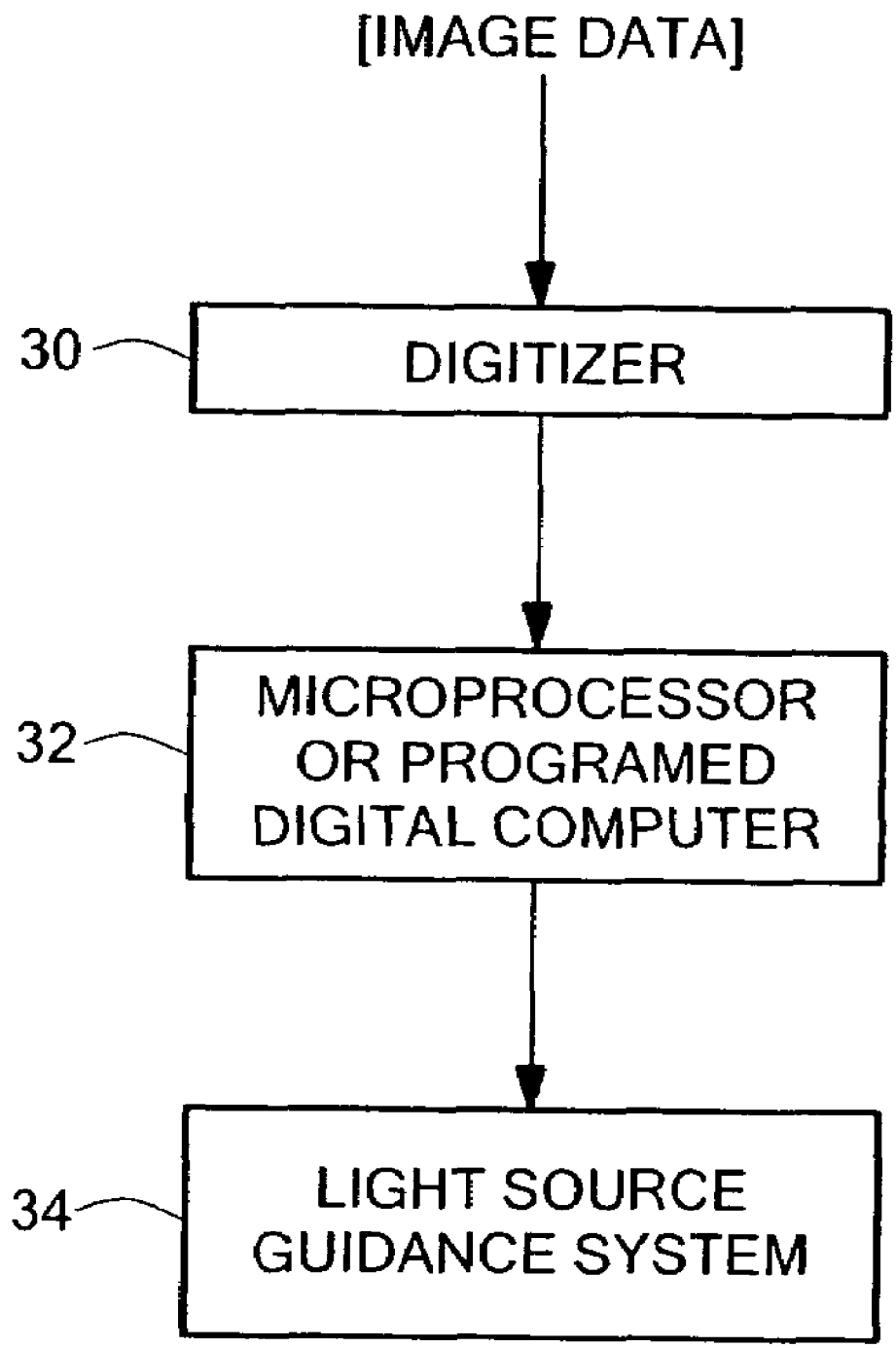
FIG. 7 shows one embodiment of the invention for illuminating the features of an object in a natural scene.

FIG. 7 shows an image enhancement system according to the invention that illuminates the features of objects in a natural scene which correspond to the luminance features in an image of such objects, e.g., bars and edges. A digitizer 30 digitizes an image of a natural scene. A microprocessor or a programmed digital computer 32 obtains the locations of the bars and edges in the image and supplies this data to a light source guidance system 34. The guidance system directs the light source to illuminate the locations in the natural scene corresponding to the bars and edges in the image of the scene. One implementation of this embodiment for laser shows and for similar applications, employs laser beams scanned over the locations of the bars and edges to illuminate these features.

Figure 8A:
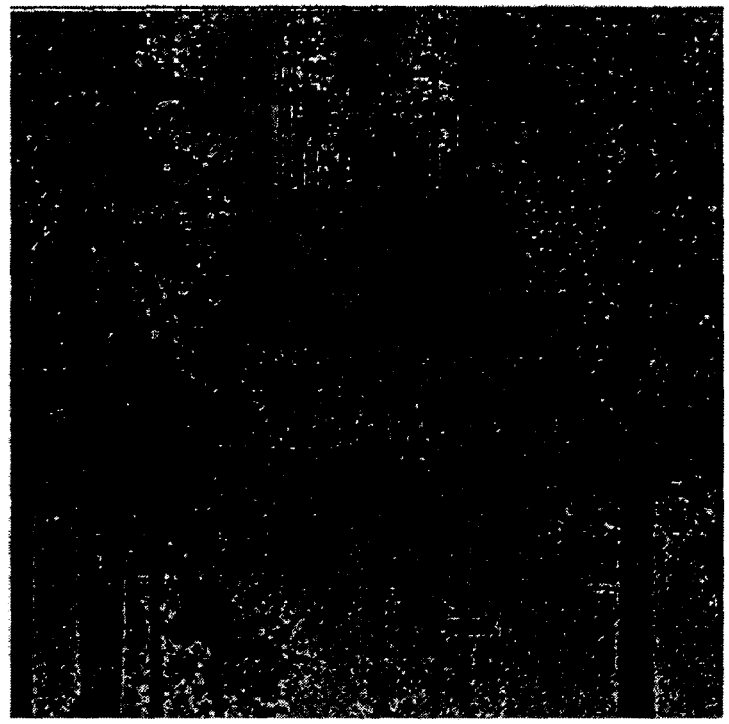
FIG. 8 illustrates enhancement of images with different sizes according to the invention, FIG. 9, similar to FIG. 8, shows the enhancement of two images with different sizes according to an embodiment of the invention.
Figure 8B:
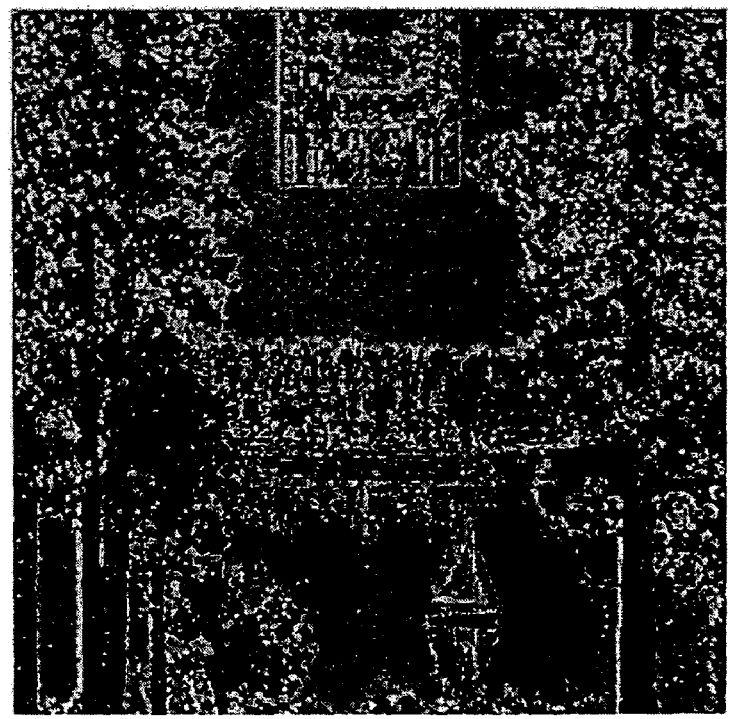
Figure 9A:
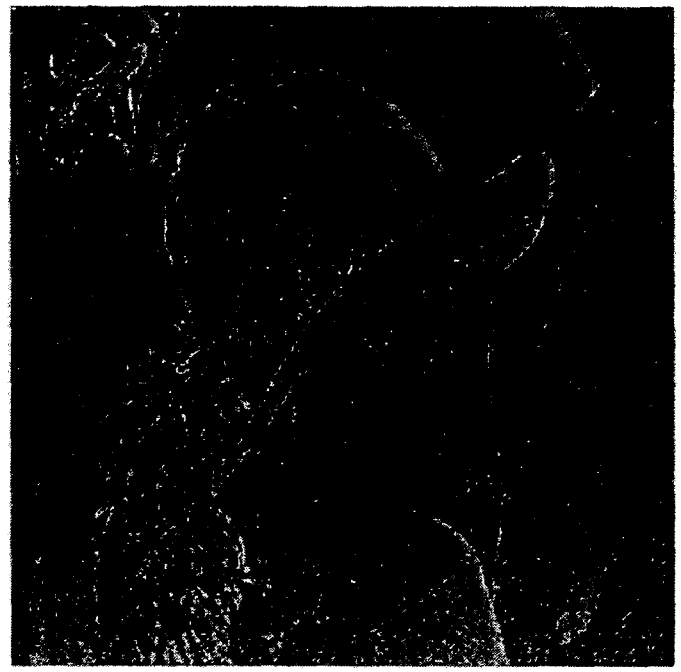
Figure 9B:

One advantage of the methods of this invention is the ability to change the size of an image while retaining a selected degree of enhancement. FIGS. 8 and 9 illustrate this aspect of the invention by presenting images of different sizes and their enhanced counterparts. In particular, these figures show images and inserts that differ in their respective areas by a scale factor, illustrated on a factor of sixteen. An examination of these two figures illustrates that the application of the methods of the invention to the smaller inserts produces visually enhanced results similar to those obtained for the full size images.

Figure 10:
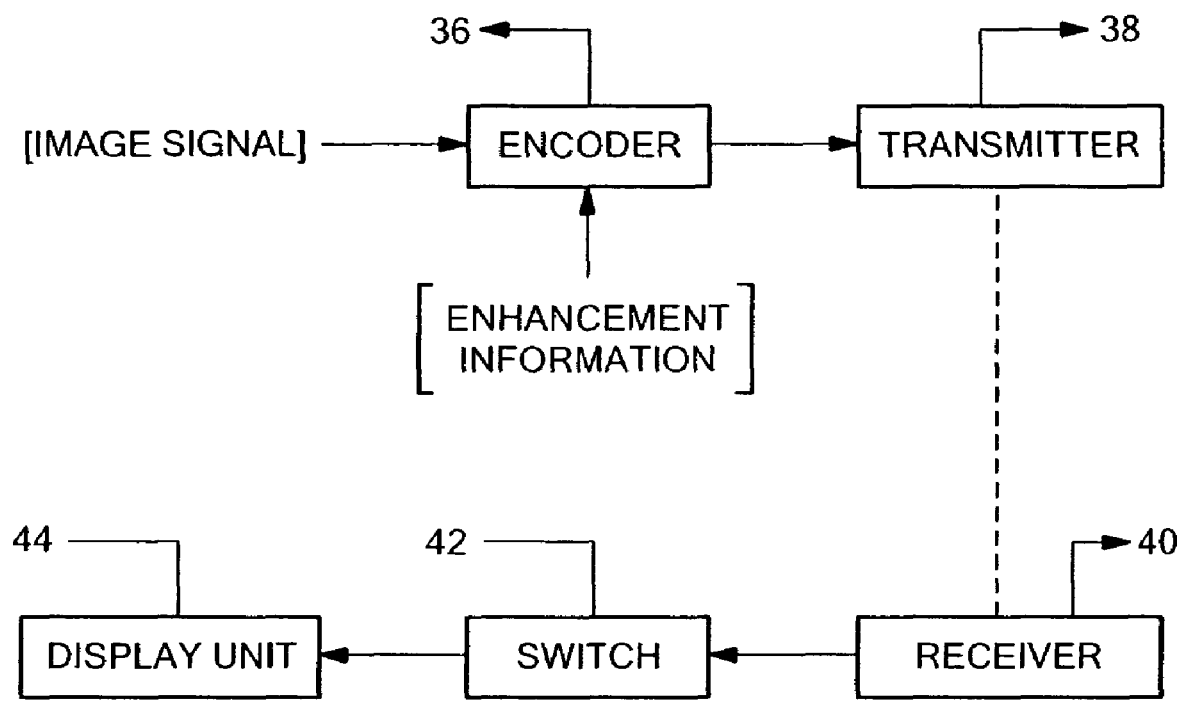
FIG. 10 shows an image processing system according to one embodiment of the invention for enhancing broadcast television images.

One application of the present invention relates to enhancing transmitted images, e.g., broadcast television images. FIG. 10 depicts an image processing system according to the invention for optional enhancement of such images. The illustrated system has an encoder 36 at a central broadcasting station for forming an enhancement signal by supplanting an image signal with information needed for enhancing the image, i.e., by identifying the pixels that need to be modified and by identifying the degree of modification of each pixel. The broadcast of the enhancement signal is manageable because the methods of the invention modify only a small fraction of the pixels that constitute the image, thus requiring minimal expansion of the transmission bandwidth. A transmitter 38 sends the original image data and the enhancing information to a receiver 40 that optionally uses the information for enhancing the received image. In an analog television system, the enhancing information is transmitted to the receiver during the so-called "blank time," in a manner similar to that utilized for producing captions for the hearing impaired, to produce an enhanced image for viewers with visual impairments. Further reference to FIG. 10 shows a decoder 36a that decodes the encoded signal and a switch 42 that controls whether the original image data or an enhanced image is sent from the decoder to a display unit 44.

The image-enhancing practices of the invention are not limited to gray scale pictures and can also be employed to enhance color pictures.

Figure 11:
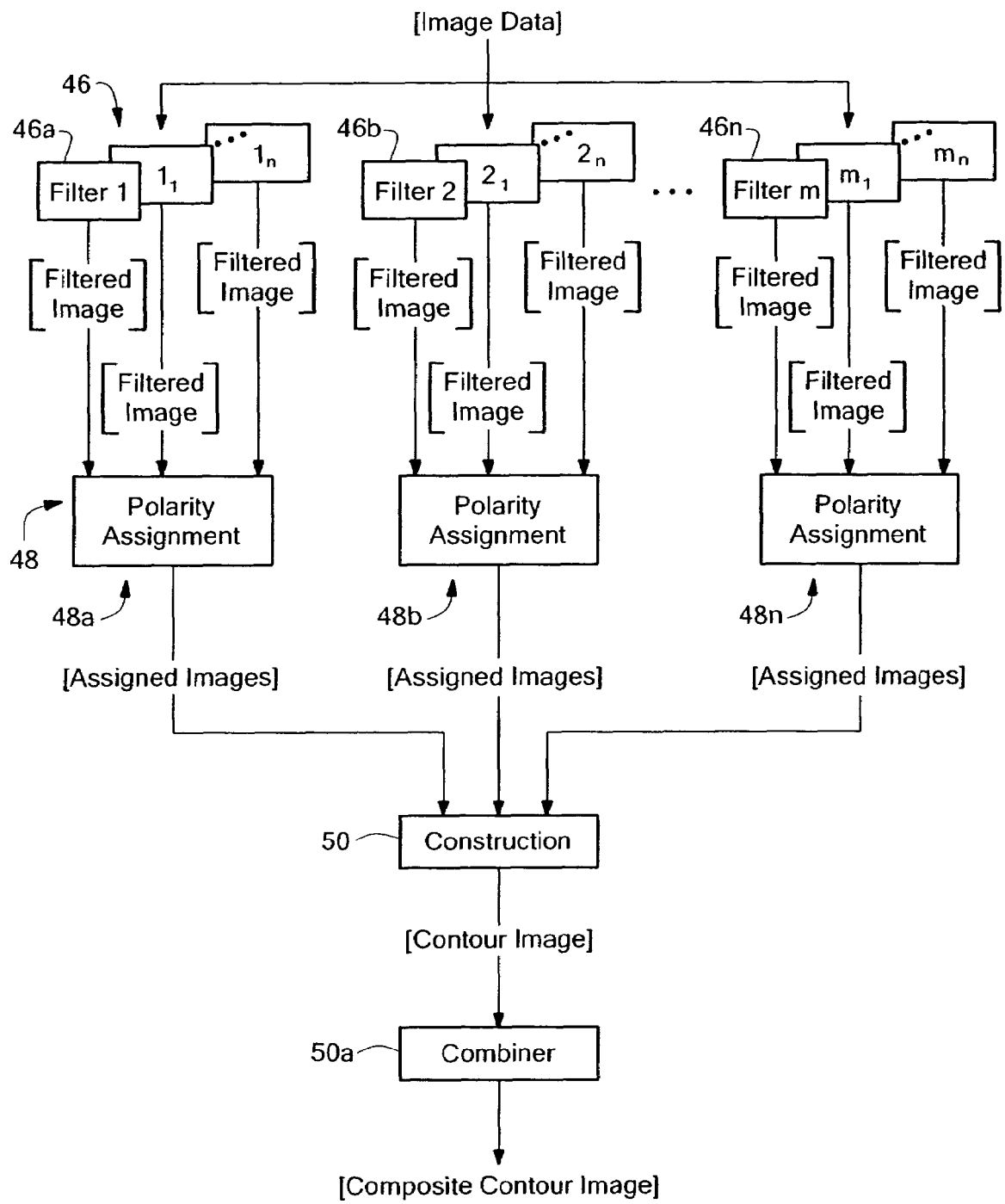
FIG. 11 is a flow chart of a sequence according to the invention and depicts various steps for extracting luminance features of an image by employing a plurality of oriented filters according to the teachings of the invention.

One preferred practice of the invention employs a plurality of oriented filters for the detection of luminance features, such as edges and/or bars, in complex natural images. In particular, the flow chart of FIG. 11 shows a sequence of steps that one preferred embodiment of the invention, which utilizes oriented filters, employs to extract features of a natural image. The illustrated embodiment in step 46 applies at least a band pass filter in spatial domain to received image data, such as a digital image of a natural scene, to obtain a filtered image. A variety of band pass filters suitable for use in practicing step 46 are known in the art. One example of such a filter includes a two-dimensional spatial filter whose angular profile is smoothed by a Gaussian multiplier. See E. Peli, "Adaptive Enhancement Based On A Visual Model", Optical Engineering, vol. 26 No.7, pp. 655-680 (1987). Other filters known in the art, such as cosine log filters, can also be employed. See E. Peli, "Contrast In Complex Images", Journal of the Optical Society of America A, vol. 7, No. 10, pp. 2032-2040 (1990).

The illustrated filters 1 through n are centered at progressively higher frequencies. One preferred practice of the invention selects the center frequencies of the filters to be in a mid-frequency range, i.e., the range of frequencies does not include very low or very high frequencies. For example, for processing an image having 512 pixels, the selected frequencies can be in the range 16 cycles/image to 128 cycles/image.

In addition to employing filters centered at different frequencies, one preferred practice of the invention also employs a plurality of spatial filters oriented along different directions in the image plane, e.g., horizontal, vertical or diagonal. For example, application of a set of illustrated filters $1_1$ through $1_n$, each having a different orientation and the same center frequency as that of filter 1, to the image data produces a set of filtered images. Further, FIG. 11 illustrates filers $2_1$ through $2_n$, and $m_1$ through $m_n$ that have the same center frequencies as those of the filters 2 and m, respectively, and have a plurality of different orientations. Application of such selected filters to the image data produces a set of spatially filtered images.

A polarity assignment step 48 receives the filtered images and assigns luminance scales to the pixels of each filtered image according to the following criteria, to obtain an assigned image. The assignment step 48 represents each pixel having an amplitude whose absolute value is below a selected threshold, determined for example by the visual response function, by a gray scale or a zero value, and represents each pixel having a negative amplitude whose absolute value is above the selected threshold by a dark scale or −1 value. Each pixel having a positive amplitude whose absolute value is above the selected threshold is represented by a light scale or +1 value. The illustrated embodiment applies a number of such filtering and assignment steps, 46a, 48a, 46b, 48b, . . . , 46n, 48n having different filters, but the same assignment procedure, in parallel to the image data to obtain a plurality of assigned, filtered images. For example, the illustrated embodiment in step 46b applies bandpass filters, 2, $2_1$, . . . , $2_n$, selected to have a spatial frequency response that is different from that of the filters applied in step 46a, to the image data. For example, the filters in step 46b can be selected to have a frequency response that is centered at a higher frequency than that of the filters in step 46a, i.e., the filters in step 46b do not suppress the high spatial frequencies of the image to the degree that the previous filters do. Application of the filters of the step 46b to the image data produces other filtered images that an assignment step 48b receives. The assignment step 48b assigns dark, gray, or light scales to the pixels of each filtered image obtained through the step 46b, based on the same criterion as that employed by the assignment step 48a. Thus, a set of one or more filtering and assignment steps, applied in parallel to the input image data, provides a plurality of filtered, assigned images.

A construction step 50 receives data corresponding to all filtered, assigned images, to construct features of the original image. In particular, the construction step 50 inspects each pixel in each of the assigned images, and represents a pixel by a light scale if the pixel is represented by a light scale in all assigned images, and represents a pixel by a dark scale if the pixel is represented by a dark scale in all of the assigned images. The remaining pixels are represented by a gray scale. The construction step 50 employs the foregoing procedure employed to represent features of the image by dark, light, and gray dots. Thus, the construction step 50 provides a contour image corresponding to each filtered image. Such contour images can be utilized individually. Alternatively, a combiner step 50a provides a composite contour image by combining a selected number of the contour images received from the construction step 50.

Figure 11A:
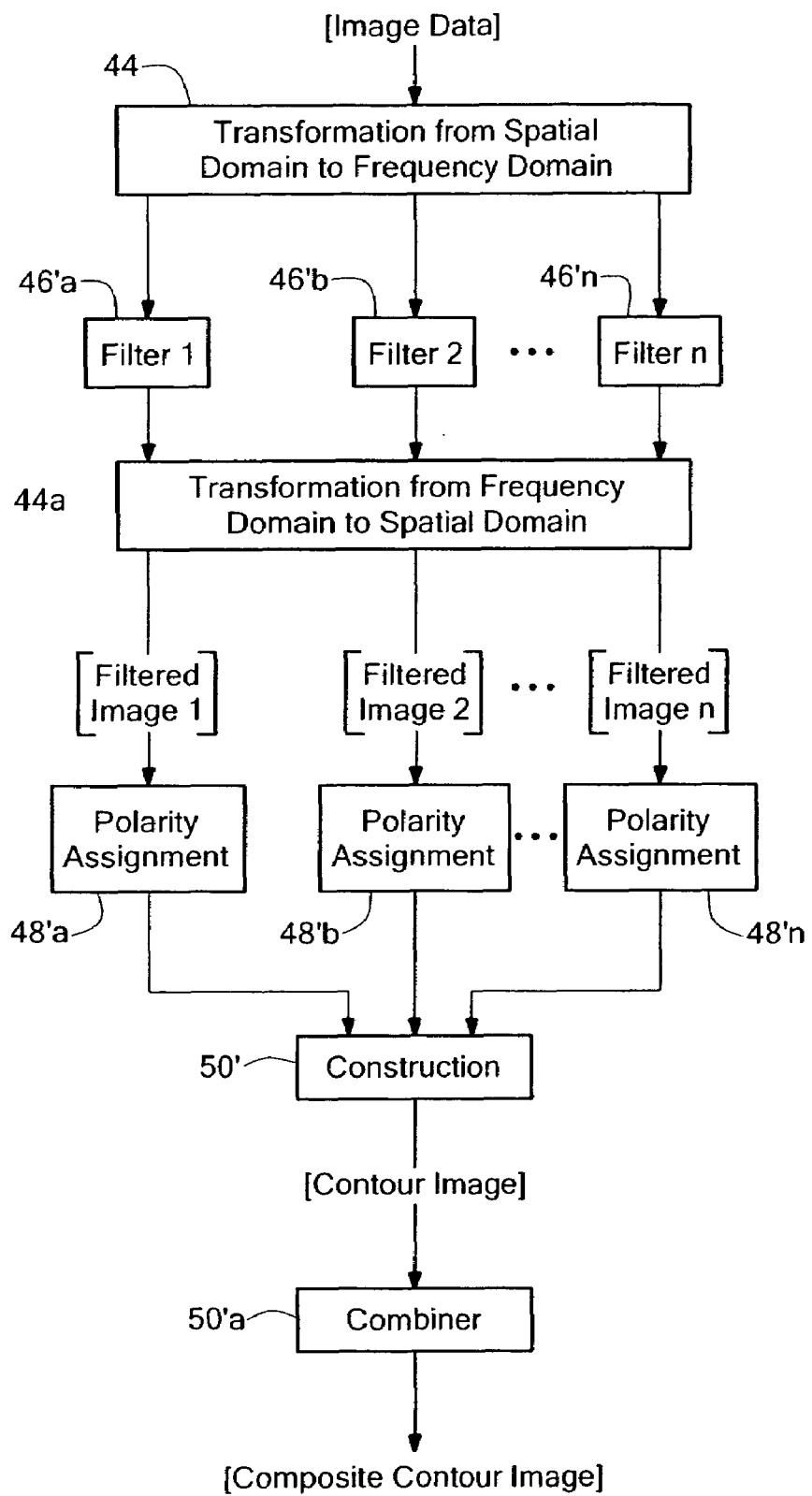
FIG. 11a is a flow chart of an exemplary sequence of steps for extracting luminance features of an image by employing a plurality of filters in the frequency domain according to the teachings of the invention.

The above method for extracting features of an image advantageously obtains the polarity of edges, i.e., a transition from light to dark, automatically and without inspection of the original image. It should be understood that the above method can employ both spatial domain and frequency domain filters. In particular, those skilled in the art will recognize that filters in the frequency domain can be employed in various filtering steps of FIG. 11. Employment of such frequency domain filters necessitates transforming the image data from the frequency domain to the spatial domain, to obtain a modified natural image that delineates the features of the image. In particular, with reference to FIG. 11a, a transformation 44', such as a Discrete Fourier Transform or a wavelet transform or other known transforms for transforming a digital image from the spatial domain to the frequency domain, of the image data to the frequency domain provides a frequency domain version of the image data. Application of filtering steps 46'a, 46'b, . . . , 46'n, to the frequency domain image data, for example through deleting selected frequency components, produces a plurality of filtered frequency-domain images. A transformation 44'a, such as Inverse Discrete Fourier Transform, from the frequency domain to the spatial domain applied to the filtered frequency-domain image data provides a plurality of filtered images in the spatial domain. A plurality of assignment steps 48'a, 48'b, . . . , 48'n, assign dark, light, and gray scales to the pixels of the filtered images in the spatial domain by employing the same criterion described in connection with the assignment step 48 of FIG. 11. A construction step 50' obtains a contour image of the original image data in a manner identical to that described in connection with the step 50 of FIG. 11. A combiner step 50'a optionally combines a selected number of the contour images received from the construction step 50, to produce a composite contour image.

Figure 12:
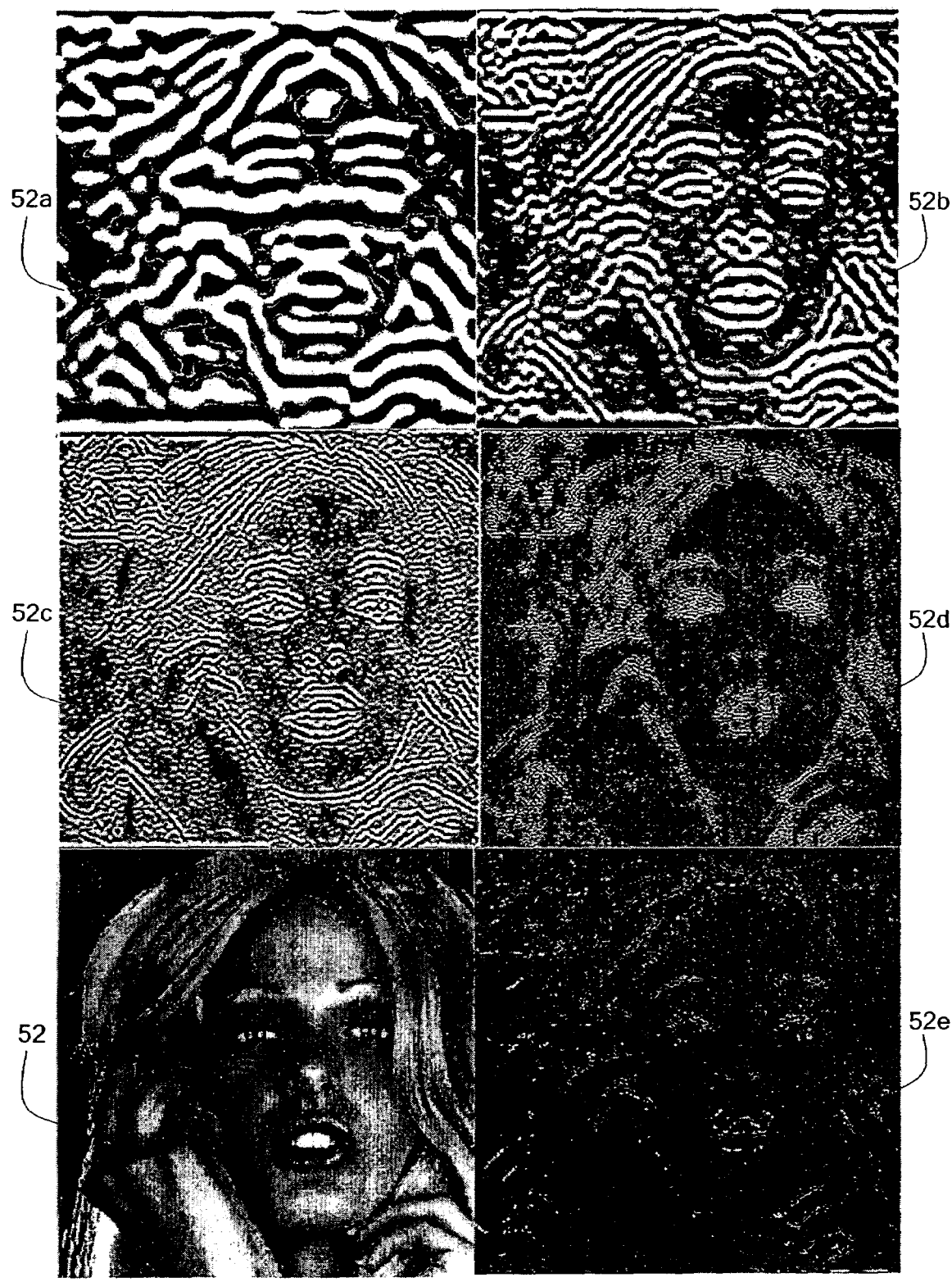
FIG. 12 illustrates an exemplary application of the method of FIG. 11, in which only one filter orientation was employed, to a natural image for extracting the luminance features of the natural image.

As an illustration of the application of the above methods to a natural image, FIG. 12 shows a natural image 52 whose features are extracted through a filtering procedure according to the method of FIG. 11. The filtering procedure employs four horizontally oriented spatial frequency filters. In particular, application of the first oriented spatial bandpass filter, centered at a frequency of 16 cycles/image, and subsequently a polarity assignment to the natural image 52 provides a filtered assigned image 52a in which the pixels having positive amplitudes whose absolute values are above a selected threshold are represented by light dots, and pixels having negative amplitudes whose absolute values are above the selected threshold are represented by light dots. The gray areas in the filtered image 52a correspond to the pixels having amplitudes whose absolute values are below the selected threshold.

The filtered image 52a illustrates features corresponding to low frequency spatial variations in the natural image. Application of a separate filter, centered at a frequency of 32 cycles/image, and a polarity assignment procedure to the natural image 52 provides a second filtered, assigned image 52b, in which the pixels are represented by gray, dark, or light dots according to the same procedure as that employed to obtain the filtered image 52a. The filtered image 52b contains spatial variations at higher frequencies than those in the filtered image 52a. Application of third and fourth filters, having center frequencies of 64 and 128 cycles/image, and assignment steps to the natural image 52 provides filtered, assigned images 52c and 52d, respectively.

A constructed image 52e that shows the features of the natural image is obtained by inspecting each pixel of the filtered assigned images 52a, 52b, 52c, and 52d. If the pixel is represented by a light dot in all of the four assigned images, the pixel is represented by a light dot in the constructed image 52e. If the pixel is represented by a dark dot in all of the four assigned images 52a, 52b, 52c, and 52d, the pixel is represented by a dark dot in the constructed image 52e. The remaining dots are represented by a gray scale. It should be understood that any number of filters can be employed according to the above method of the invention to obtain a desired contour image. For example, in certain applications, it may be desirable to apply a number of high frequency filters to capture contrast variations in the natural image that occur over a small spatial scale, i.e., high-frequency variations, whereas in other applications, it may be desirable to include many low frequency filters.

In one aspect, the present invention allows a patient having a restricted peripheral vision to locate objects quickly that lie outside her instantaneous field of vision. The term instantaneous field of vision as employed herein refers to a patient's peripheral vision while the patient is viewing a scene without eye and/or head movements. Many patients suffer from a loss in peripheral field of view due to a variety of conditions such as end-stage Glaucoma or Retinitis Pigmentosa ("RP"). Although many jurisdictions consider patients having a central field of view of less than 20 degree diameter as legally blind, considerable difficulties arise in the mobility of a patient when her field of view shrinks to about 5 degrees in diameter or less.

A conventional approach for improving the field of view of such patients employs an optical reverse telescope that provides a spatially compressed, i.e., minified, view of a natural scene to one eye of the patient. The minified view presents a representation of a wider field of view into the limited visual field of the patient. One drawback of this conventional methodology is that the resolution of the minified image is typically considerably lower than that of the non-minified image.

Figure 13:
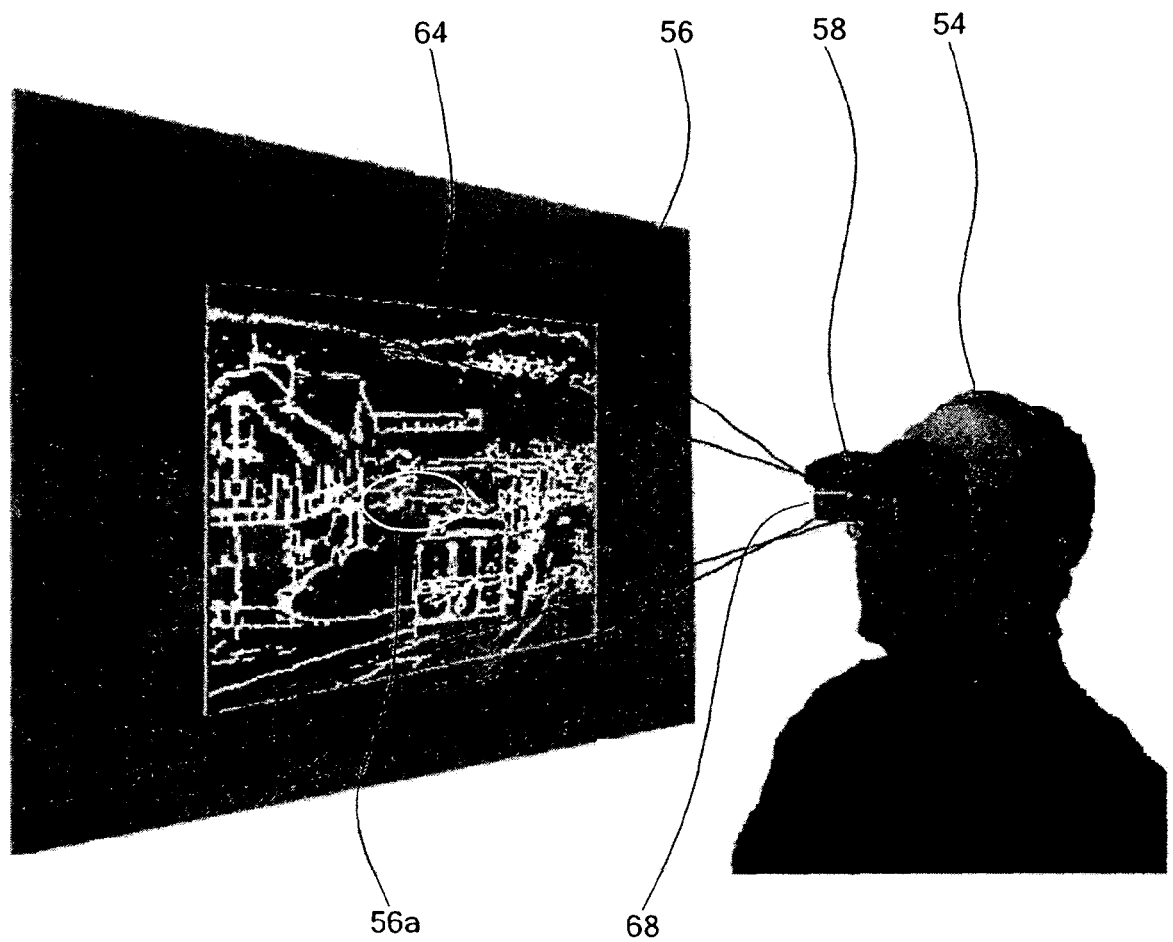
FIG. 13 illustrates a patient, suffering from a loss of peripheral vision, viewing a natural scene through a corrective viewer according to the invention that provides the patient with a minified cartoon image of the scene.
Figure 13A:
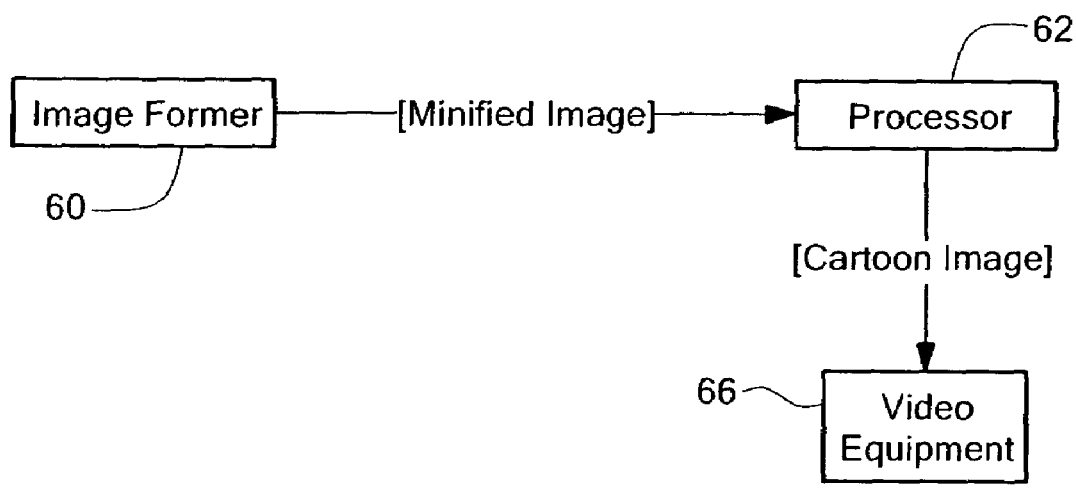
FIG. 13a is a schematic diagram of the apparatus of FIG. 13.

One practice of the invention for expanding a patient's field of view solves the foregoing and other shortcomings of the conventional methods by providing at least one eye of the patient with a minified view of a natural scene whose features have been extracted, and typically enhanced, according to the teachings of the invention. Reference to FIGS. 13 and 13a shows a patient 54, having functional eyes both of which suffer from a loss of peripheral vision, viewing a natural scene 56 through a corrective viewer 58. A small ellipse 56a indicates the field of view of the patient, for example a 5 degree field. The schematic diagram of FIG. 13a illustrates that the viewer 58 of FIG. 13 includes an image former 60, such as a digital camera equipped with a minifier, such as a reverse optical telescope, to obtain a minified image of the natural scene. A processor 62 receives the minified image data, extracts luminance features of the image, such as edges and bars, according to the teachings of the invention, to obtain data corresponding to a contour image 64, shown in FIG. 13, that delineates features of the natural scene. Such an image of the natural scene is herein referred to as a cartoon image. The image 64 can, for example, present a 25-degree minified image of the contours of objects in a natural scene that spans a 100-degree field of view. A display module 66, shown schematically in FIG. 13a, projects the cartoon image 64, shown in FIG. 13, onto a transparent screen 68 of the viewer 58 of FIG. 13, i.e., a see-through screen, disposed in front of at least one of the patient's eyes. A patient having a 5 degree field of view can, at any instant, see a 20 degree slice of the natural image in contours by viewing the cartoon image.

A patient can advantageously scan the cartoon image 64 quickly in search of objects of interest. Slight eye movements allow the patient to locate objects in the cartoon image. Once the patient identifies a cartoon image of an object, the patient can then locate the actual object in the natural scene by eye movements, without any head movements, or with a combination of eye and head movements. In particular, the viewer 58 is preferably configured not to block the peripheral vision of the patient. Thus, once the patient identifies a cartoon image of an object that lies outside her instantaneous peripheral vision, the patient can locate the actual object by moving her eyes toward the direction indicated by the cartoon image of the object. Alternatively, the patient can locate the object in the natural scene by a combination of eye and head movements. Thus, the apparatus 58 advantageously allows a patient with restricted peripheral vision to locate quickly objects outside her instantaneous field of view, and to obtain a high-resolution view of such objects by viewing them directly.

Figure 14:
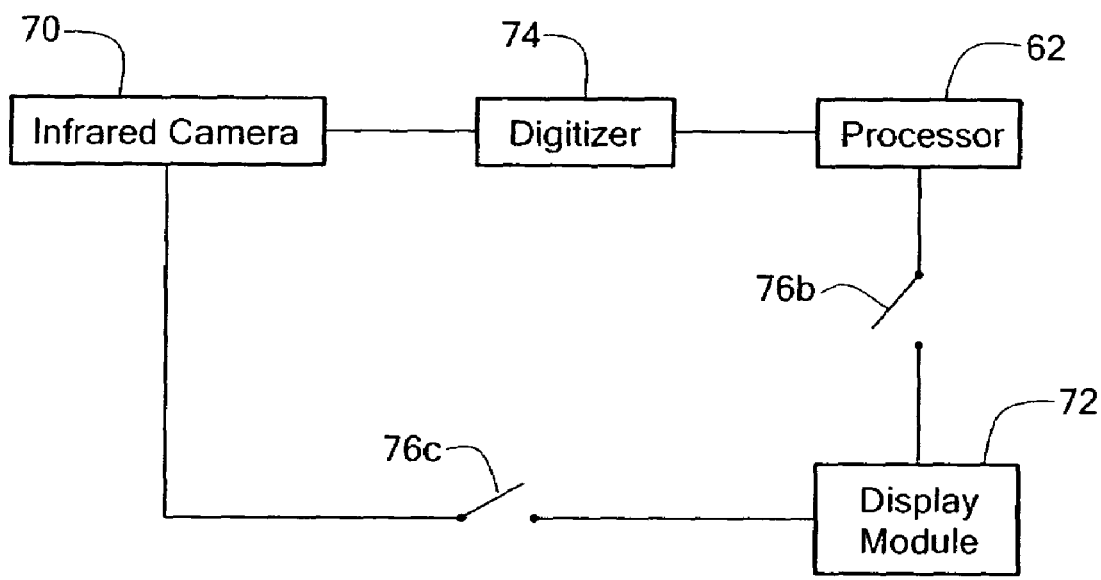
FIG. 14 is a schematic diagram of night vision apparatus according to the present invention that provides an observer with either a bright infrared image or a contour image of the surrounding or both.

Patients having RP typically also suffer from night blindness or loss of night vision. One practice of the invention provides an infrared night vision device that displays a bright image of a natural scene on one screen, and a minified cartoon version of the image, obtained through the foregoing teachings of the invention, on the same or another screen. In particular, in one embodiment of the night vision device of the invention depicted schematically in FIG. 14, an infrared camera 70 obtains an infrared image of a natural scene, and a display module 72 displays the image on a screen, preferably spectacle mounted or mounted to move with the movement of the patient's head, disposed in front of at least one of the patient's eyes. A digitizer 74 digitizes the infrared image, and provides the digitized data to a digital processor 76 that obtains data corresponding to contours of the luminance features of the image according to the teachings set forth above in reference to FIGS. 1, 11, and/or 11a. The display module 72 of FIG. 14 displays the contour image on the same or on a separate screen, preferably spectacle mounted, disposed in front of the patient's eyes. The display module 72 can, for example, employ a diode laser source and a set of mirrors, that can be selectively actuated, to trace out the contour features by the laser beam in a known manner, for displaying the cartoon image. The invention can be employed with the combination of the two images, or with either image alone. For example, switches 76b and 76c allow the display module 72 to display the infrared image or the cartoon image either individually or in combination.

Such a night vision device advantageously enhances night mobility of patients who suffer from a loss of night vision and visual field loss. In addition to being useful for patients having night blindness, an infrared night vision device according to the invention can have a variety of other useful applications. For example, such a night vision device can provide a driver of an automobile with a contour image of the surrounding, by projecting the contours of objects in an image of the natural scene, obtained for example by an infrared camera, onto the windshield of the automobile. Such projection of the contours of the image has certain advantages over projection of a bright image, obtained by an infrared camera, onto the windshield. For example, during periods of low ambient light intensity, e.g., night time, projection of a bright image onto the windshield can lower the viewing contrast through the windshield. A contour outline projected onto the windshield, however, does not cause such a lowering of the contrast. Moreover, a driver can have a clear view of the surrounding while viewing the contour outlines, i.e., the contour outline does not partially block the driver's view.

Figure 15:
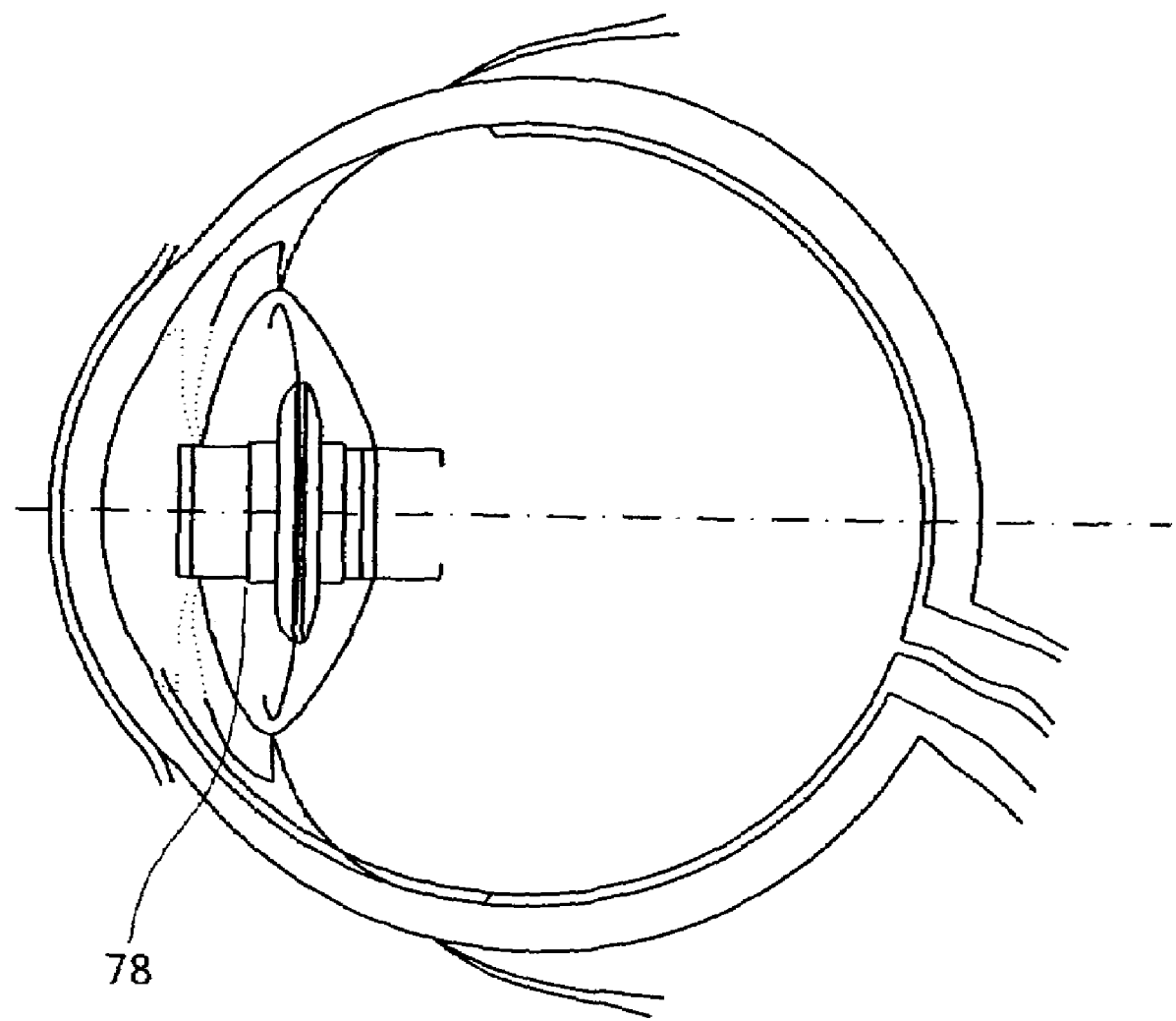
FIG. 15 depicts a method according to the teachings of the invention for increasing the field of view of a patient suffering from a central field loss by intra-ocular implantation of a telescope configured as a minifier into one eye of the patient.

Another aspect of the invention relates to the intra-ocular implantation of a telescope, configured as a minifier, in one eye of a patient suffering from peripheral field loss. Such a telescope provides one eye of the patient with a wide field of view to help the mobility of the patient, while the other eye maintains the good central acuity. FIG. 15 illustrates a minifier 78 implanted into one eye of a patient according to known methods in the art. The patient can obtain a one-to-one view of a natural scene through the eye not having a minifier, and can obtain a wider view of the natural scene through the minifier 78.

It will thus be seen that the invention attains the objectives set forth above. Because certain changes in the above apparatus and processes can be made without departing from the spirit or scope of the invention, the above description is intended to be interpreted as illustrative and not in a limiting sense.

What is claimed is:

1. An apparatus for real-time modification of a natural scene for a human observer, said apparatus comprising:
   a camera for providing an image of the natural scene;
   a digitizer coupled to said camera, said digitizer receiving said image and operative to provide a digitized image having a plurality of pixels of said natural image;
   a plurality of digital filters each coupled to said digitizer to receive said digitized image of said image, each of said plurality of digital filters having a unique center frequency and each of said plurality of digital filters operative to provide a filtered digitized image;
   a threshold module coupled to said plurality of digital filters and receiving the plurality of filtered digitized images therefrom, for each of the plurality of filtered digitized images the threshold module operative to depict a pixel by a light scale when said pixel has an absolute value that is greater than a predetermined threshold and said pixel has a positive amplitude, to depict a pixel by a dark scale when said pixel has an absolute value that is greater than a predetermined threshold and said pixel has a negative amplitude, and depicting the remaining of said pixels in a gray scale;
   a contour module coupled to said threshold module and receiving said plurality of thresholded pixels, each corresponding to one of the plurality of filtered digitized images, the contour module operative to form a contour image by depicting a pixel in said contour image by a light scale if each corresponding pixel in each of the plurality of thresholded filtered digitized images is represented by a light scale, depicting a pixel in said contour image by a dark scale if each corresponding pixel in each of the plurality of thresholded filtered digitized images is represented by a dark scale, representing all remaining pixels as a gray scale, and providing a contour image of the thresholded filtered digitized image as an output.

2. The apparatus of claim 1 wherein said plurality of filters comprise oriented filters.

3. The apparatus of claim 1 wherein said plurality of filters comprise spatial domain filters.

4. The apparatus of claim 3 wherein said spatial domain filters comprise spatial domain filters having an angular profile smoothed by a Gaussian multiplier.

5. The apparatus of claim 1 wherein said plurality of filters comprise discrete Fourier transforms.

6. The apparatus of claim 1 wherein said plurality of filters comprise wavelet transforms.

7. The apparatus of claim 1 further including a display module coupled to said digitizer and to said contour module, said display module operative to project said contour image onto said digitized natural image.

8. The apparatus of claim 7 wherein said display module includes a projection module and a semi-transparent screen, wherein said projection module projects said contour image and said digitized image onto said semi-transparent screen simultaneously.

9. The apparatus of claim 8 wherein said semi-transparent screen is part of a movie screen.

10. The apparatus of claim 8 wherein said semi-transparent screen is disposed in front of an eye of an observer.

11. The apparatus of claim 1 further including a magnification module coupled between said digitizer and said threshold module, said magnification module operative to change the magnification of said digitized image.

12. The apparatus of claim 11 wherein said image magnification is reduced, thereby minifying said digital image.

13. The apparatus of claim 1 further including a magnification module coupled between said threshold module and said contour module, said magnification module operative to change the magnification of said digitized image.

14. The apparatus of claim 13 wherein said image magnification is reduced, thereby minifying said digital image.

15. The apparatus of claim 1 wherein said camera is a video camera and said image is a video image.

16. The apparatus of claim 1 wherein said camera is sensitive to the visual spectrum of light.

17. The apparatus of claim 1 wherein said camera is sensitive to the infrared spectrum of light.

18. An apparatus for real-time modification of an image signal encoded with a natural scene for a human observer, said apparatus comprising:
   a digitizer coupled to said image signal, said digitizer receiving said image signal and operative to provide a digitized image having a plurality of pixels of said natural image;
   a plurality of digital filters each coupled to said digitizer to receive said digitized image of said image, each of said plurality of digital filters having a unique center frequency and each of said plurality of digital filters operative to provide a filtered digitized image;
   a threshold module coupled to said plurality of digital filters and receiving the plurality of filtered digitized images therefrom, for each of the plurality of filtered digitized images the threshold module operative to depict a pixel by a light scale when said pixel has an absolute value that is greater than a predetermined threshold and said pixel has a positive amplitude, to depict a pixel by a dark scale when said pixel has an absolute value that is greater than a predetermined threshold and said pixel has a negative amplitude, and depicting the remaining of said pixels in a gray scale;

a contour module coupled to said threshold module and receiving said plurality of thresholded pixels, each corresponding to one of the plurality of filtered digitized images, the contour module operative to form a contour image by depicting a pixel in said contour image by a light scale if each corresponding pixel in each of the plurality of thresholded filtered digitized images is represented by a light scale, depicting a pixel in said contour image by a dark scale if each corresponding pixel in each of the plurality of thresholded filtered digitized images is represented by a dark scale, representing all remaining pixels as a gray scale, and providing a contour image of the thresholded filtered digitized image as an output;

an encoding module coupled to said image signal and to said contour module, said encoder module operative to form an enhancement signal by supplanting said image signal by identifying said portions of said image signal corresponding to said pixels in said contour image and modifying said image signal according to the degree of modification of the corresponding pixel in said contour image; and wherein said image signal and said enhancement signal are provided as outputs.

19. The apparatus of claim 18 further including a mixer module coupled to said encoding module and operative to combine said image signal and said enhancement signal into a single signal.

20. The apparatus of claim 18 further including a magnification module coupled to said image signal wherein said output image signal is of a different magnification than said enhancement signal.

21. The apparatus of claim 20 wherein said magnification module is operative to magnify the original image, wherein an image corresponding to said image signal is magnified and an image corresponding to said enhancement signal is normal sized.

22. The apparatus of claim 18 further including a transmitter coupled to said encoder module and said image signal and operative to transmit said image signal and said enhancement signal.

23. The apparatus of claim 22 further including a mixer module coupled to said encoding module and to said transmitter, said mixer module operative to combine said image signal and said enhancement signal into a single signal and to provide said single signal to said transmitter for transmission thereby.

24. The apparatus of claim 22 further including a receiver coupled to said transmitter, said receiver including a decoder that decodes said image signal and said enhancement signal, said decoder operative to select between a portion of said image signal or a combination of said image signal and said enhancement signal for display.

25. The apparatus of claim 24 further including a display module coupled to said decoder and operative to display said portion of said image signal or said enhancement signal as selected by said decoder.

26. The apparatus of claim 25 wherein the display module is a television screen.

27. The apparatus of claim 24, wherein the receiver further includes a magnification module coupled to said image signal wherein said output image signal is of a different magnification than said enhancement signal.

28. The apparatus of claim 27 wherein said magnification module is operative to magnify the original image, wherein an image corresponding to said image signal is magnified and an image corresponding to said enhancement signal is normal sized.

29. The apparatus of claim 18 wherein said image signal is a television signal.

30. The apparatus of claim 29 wherein said television signal is an analog television signal.

* * * * *